Patented July 22, 1947

2,424,420

UNITED STATES PATENT OFFICE 2,424,420

SOLVENT EXTRACTION OF ORGANIC SULPHONYL HALIDES

John Ross, Ramsey, and Dwight James Potter, Allendale, N. J., assignors to Colgate-Palmolive-Peet Company, Jersey City, N. J., a corporation of Delaware No Drawing. Application March 25, 1942, Serial No. 436,120

14 Claims. (Cl. 260—543)

This invention relates to the preparation of relatively pure organic chemical compounds, and more particularly to the purification of organic sulphonyl halides. It is in particular directed to an improved process for preparing surface-active agents by the reaction of aliphatic organic compounds with sulphur dioxide and a halogen, extraction of the resulting sulphonyl halide with a selective solvent, and hydrolysis and neutralization of the aliphatic sulphonyl halide.

In the preparation of organic sulphonyl halides, it is often found that unreacted materials and various organic by-products are mixed with the sulphonyl halide products. These impurities may comprise, among other things, hydrocarbons, alcohols, esters and acids, either halogenated or non-halogenated and of paraffinic or cycloparaffinic nature. Because of the solvent action of the organic sulphonyl halides, appreciable quantities of the unreacted hydrocarbons, halogenated hydrocarbons, and similar materials are held in solution and hence cannot be readily separated by direct physical methods.

The presence of unreacted hydrocarbons or halogenated hydrocarbons or the like often has definite detrimental effects upon the efficiency of the organic sulphonates prepared from these sulphonyl halides, which is shown by a marked lowering of their wetting, washing and emulsifying efficiency. In addition, water solutions of the resulting sulphonates containing such unsulphonated materials are often characterized by an opalescence even when the concentration is very low. For these and other reasons it is obviously highly desirable for certain purposes to remove the water-insoluble organic materials from the sulphonated product or from the organic sulphonyl halides before their conversion to sulphonated products.

The organic sulphonyl halides are usually converted to the corresponding organic sulphonic acid salts by boiling with aqueous alkali. This step is usually accompanied by operating difficulties when high molecular weight hydrocarbons, alcohols, and like materials are present, since these compounds cause difficultly controllable foaming and may possibly enter into reaction with the organic sulphonyl halides in the presence of the alkali. Some of the water-insoluble impurities separate out from the aqueous solution, but, because of the solubilizing and emulsifying action of the sulphonate, appreciable quantities of the hydrocarbon-like materials remain dispersed or dissolved therein. The separation of these remaining impurities is a troublesome problem. A possible method is to dilute the crude sulphonate salts with water, thus decreasing the miscibility of the unreacted material, and this dilute water solution is then extracted with a volatile water-immiscible solvent to remove the remaining hydrocarbon-like material. Additional unsulphonated materials may form a supernatant layer directly upon this dilution, which layer is removed before extracting the water layer containing dissolved sulphonic acid with the organic liquids.

This method of solvent extraction of the aqueous solution of sodium sulphonate has generally been found to be inefficient, laborious and expensive. The volume of aqueous solution of sulphonate to be extracted is obviously much greater than the original organic sulphonyl halides, thus rendering the treatment of the former more time-consuming and burdensome. It is expensive because large amounts of organic solvents are commonly required as extractants, examples being ethyl ether, gasoline and benzene. The emulsifying action of the sulphonate salts tends to emulsify the solvent solution in the aqueous layer which obviously reduces the efficiency of the extraction process. This can be corrected to some extent by the addition of water-soluble oxygenated solvents, such as ethyl alcohol, isopropyl alcohol, acetone or the like.

It is an object of the invention disclosed herein to provide a novel method of removing the organic sulphonyl halides from unreacted materials and other organic impurities.

Another object is to provide an inexpensive, safe and simple process for extracting organic sulphonyl halides from organic impurities, such as unreacted hydrocarbons, acids, alcohols, their halogenated derivatives and the like, by treating these compounds with a selective solvent for the sulphonyl halides and separating the solvent phase formed from the impurities, such as hydrocarbons and halogenated hydrocarbons.

It is also an object of this invention to prepare organic sulphonyl halides substantially free from unsaponifiable constituents in order that the hydrolysis to the salts can be readily controlled and undesirable condensation reactions with impurities do not occur.

It is a further object of the invention to provide a process for purifying continuously the organic sulphonyl halides by removal from the "non-sulphonated" constituents with a selective solvent either simultaneously with or subsequent to their preparation.

A still further object is the provision of a process for the purification or organic sulphonyl halides obtained by the action of sulphur dioxide and halogen, or equivalent agents, on hydrocarbon-containing materials by treating the reaction mass with a preferential solvent for the organic sulphonyl halides with or without a low boiling immiscible solvent for hydrocarbons, halogenated hydrocarbons, or the like, which latter solvent is substantially immiscible with the first named preferential solvent under the treating conditions.

Other objects of the invention will be apparent from the more detailed description given hereafter.

It has now been discovered that solvents for polar compounds, including such solvents as nitromethane, ethyl alcohol, methyl formate or liquid sulphur dioxide, can be used with advantage as selective solvent media for separating organic sulphonyl halides from unreacted hydrocarbon-like materials and the halogenated derivatives thereof in the reaction product obtained when hydrocarbons or like materials are reacted with sulphur dioxide and a halogen, or equivalent agents. It has been found that organic sulphonyl halides are relatively soluble in these preferential solvents, such as nitroalkanes, alcohols, esters or liquid sulphur dioxide, whereas the unreacted or merely halogenated materials are insoluble or sparingly soluble therein. Accordingly, this invention contemplates the treatment of organic sulphonyl halides which contain hydrocarbons and like liquid materials as impurities, with a preferential solvent, such as nitromethane, liquid sulphur dioxide or other preferential solvents with or without an immiscible solvent, such as hexane or other substantially non-polar solvents, and separating the polar-preferential solvent phase which is formed. By treatments in this manner, substantially all the impurities are removed, and the organic sulphonyl halides separated from the preferential solvent are substantially pure, and consequently more desirable because of the unimpaired detergent properties of the sulphonates derived therefrom. The low boiling solvents, such as methyl formate or liquid sulphur dioxide, may be readily separated from the organic sulphonyl halides by vaporization, and may be condensed and reused for treatment of additional material, or for any other purpose.

A preferred process of this invention may be performed by adding about an equal volume of an oxygen-containing preferential solvent for the polar sulphonyl halides, such as nitromethane, methyl formate or liquid sulphur dioxide, to the organic sulphonyl halide reaction mixture and then an equal volume of immiscible non-polar solvent, such as hexane. The order of adding the two type solvents may be reversed, or they may be used simultaneously. The mixture separates sharply into two liquid phases. One of the phases consists mainly of polar solvent and contains the major portion of the organic sulphonyl halide, and the other phase contains the non-polar solvent solution of hydrocarbon-like material and halogenated derivatives thereof. The oxygenated solvent, particularly liquid sulphur dioxide, layer is usually more dense than the non-polar solvent, particularly hexane, layer; hence, the latter forms the upper layer. It is desirable to form layers having widely different specific gravities in order to promote separation.

The polar solvent phase, such as the methyl formate or liquid sulphur dioxide layer, may be separated by known methods, decantation, centrifuging or the like, and will be found to contain most of the organic sulphonyl halides. It may be rewashed with additional non-polar solvents, such as hexane, to cause more complete purification. The non-polar solvent solution contains most of the impurities and may be successively extracted or washed with additional polar solvent until it is substantially free of organic sulphonyl halides. These solvents which are immiscible and non-reactive with the preferential solvent for the sulphonyl halides under the reaction conditions will assist in removing non-sulphonated material which is somewhat soluble in the liquid sulphur dioxide or other polar solvent, but which material is less polar than the sulphonyl halides, e. g., aromatics, olefines and the like.

The resulting organic sulphonyl halides may then be hydrolyzed to yield a sulphonate product relatively free from oil and other organic impurities. It has been found that the hydrolysis process is more easily controlled when performed with these purified organic sulphonyl halides substantially free from heavy hydrocarbons, alcohols, acids, halogenated hydrocarbons, acids and alcohols, and like materials.

The process of this invention lends itself to continuous extraction procedure, e. g., by dilution of the mixture with one solvent and countercurrent washing with the other solvent, which may be most effectively and economically carried out.

It is within the scope of the invention to employ one or more preferential solvents, such as liquid sulphur dioxide with an alkyl sulphate, with or without one or more other solvents which are soluble in the selected polar solvent phase, which added solvents will increase the solubility of the organic sulphonyl halides contained therein or will depress the solubility of the impurities in the polar solvent.

It is possible to introduce into the mixture before or during extraction, other polar-solvent-soluble materials that are desired to be retained in the final sulphonate product. For example, if petroleum sulphonic acids, or even inorganic substances, such as metal halides, are to be incorporated into the final reaction product, these materials may be added directly with the solvents to the organic sulphonyl halides to be extracted.

It is preferred to operate within a range of from about −30° C. to about +50° C., although lower or higher temperatures may be employed. Lower temperatures are generally conducive to greater selectivity. The process may be carried out at higher temperatures, but it must be recognized that under such conditions of higher temperatures and pressures, technical difficulties such as are due to corrosion may be increased. When operating at higher temperatures and pressures, it is sometimes necessary to employ an autoclave or similar pressure apparatus.

For a fuller understanding of the nature and objects of the invention, reference should be had to the following examples which are given merely to illustrate the invention and are not to be construed in a limiting sense.

*Example I*

A Pennsylvania gas oil is fractionally distilled and a cut taken which boils between about 300° and 310° C. This cut is extracted with phenol to remove the more unsaturated and aromatic constituents therefrom. 300 parts by weight of the raffinate free from phenol are treated over a period of about two hours with a gaseous mixture of 75 parts by weight of chlorine and 200 parts by weight of sulphur dioxide. The reaction is conducted under the illumination of a mercury arc lamp at a temperature of about 10° C. After all the gases have been passed through the hydrocarbon under treatment, the gain in weight is about 65 parts. The sulphonyl halide product is atomized into a vacuum chamber at a low temperature in order to remove the major proportion of dissolved gases. It is then treated with an equal volume of ethanol containing about 5% water in order to dissolve selectively the desired sulphonyl halide product leaving the insoluble unreacted hydrocarbon and halogenated hydrocarbon in a raffinate phase, which is again washed with an equal quantity of 95% ethanol. The raffinate from the second extract is extracted a third time, and the resulting raffinate substantially freed of sulphonyl halides is retreated with admixed sulphur dioxide and chlorine along with a fresh supply of the extracted gas oil. The several alcohol extracts are combined and the resulting mixture divided into two portions. The major proportion of solvent is removed from one portion by distillation, and the resulting product neutralized with soda ash. The remaining alcohol serves to reduce foaming. The other portion is freed of solvent by extracting with water; these sulphonyl halides are then neutralized with concentrated caustic soda solution.

*Example II*

In the bottom of a six-foot glass column packed with quartz beads is placed a pool of liquid sulphur dioxide. Above this pool, the packed column is filled with pentadecans at a temperature of about —10° C. Into the column at a point near the base but slightly above the pool of liquid sulphur dioxide, a 2:1 mixture of sulphur dioxide gas and chlorine gas is introduced. The column is subjected to the radiation from a blue luminescent lamp. Into the top of the column is introduced a precooled stream of pentadecanes and a dispersed flow of liquid sulphur dioxide; the proportion of these two being approximately 5 volumes of liquid sulphur dioxide to 1 volume of pentadecanes, and the mol ratio of pentadecanes to chlorine gas being about 1 to 1.1. The rate of introduction of the organic material and solvent shall be such that it takes two hours for a total weight of 3,000 parts of pentadecanes to be passed into the column. During this same period, the total weight of mixed gases shall be about one-third of the weight of pentadecanes introduced. The organic sulphonyl halides formed are extracted by the liquid sulphur dioxide, and the resulting solution collects at the bottom of the column from which it is withdrawn at such a rate that a substantially uniform quantity of liquid sulphur dioxide containing dissolved sulphonyl halide remains as a pool below the port for introducing the gaseous mixture of sulphur dioxide and chlorine. The presence of both gaseous and liquid sulphur dioxide at a substantially uniform pressure gives exact temperature control. After the treatment, the liquid sulphur dioxide solution removed from the bottom of the column is permitted to settle and any unreacted oil is removed from the surface thereof. The solution is then heated slightly under vacuum in order to remove any liquid sulphur dioxide. The resulting sulphonyl halides are hydrolyzed with 40% caustic soda solution (25% excess) in a concurrent procedure using a tortuous path to obtain thorough mixing. The product is then neutralized with dilute sulphuric acid and the aqueous solution is dried on heating rolls to obtain a light-colored flaky product containing sodium sulphate.

*Examples III, IV and V*

A crude mixture of organic sulphonyl halides is obtained by treating about 2,350 grams of a Pennsylvania white oil with 355 grams of chlorine gas and 1,000 grams of sulphur dioxide gas, which crude mixture contains about 41.7% sulphonyl chlorides and about 58.3% of unsaponifiable material on a weight basis. 50 grams of the crude mixture requires 131 milli-equivalents of sodium hydroxide for hydrolysis. Three 50 gram portions of the crude unhydrolyzed mixture are solvent extracted with different solvents by the following procedure: one each with methyl formate, nitromethane and methanol. 50 grams of the crude mixture is shaken at room temperature with 50 cc. of the solvent, the solvent layer is separated and the undissolved oil removed. This raffinate in each case is shaken twice with 25 cc. additional portions of the same solvent. The solvent solutions involving the same solvent are combined in each case and freed of solvent by evaporation; the last traces being removed by application of vacuum. The raffinates are similarly treated to remove retained solvent. The results are given in the following tabulation:

|  | Methyl Formate | Nitromethane | Methanol |
|---|---|---|---|
| Weight extract............grams.. | 32 | 11½ | 13 |
| Weight raffinate.............do.... | 18 | 40 | 38½ |
| Per cent Sulphonyl chlorides in original material.................... | 42 | 42 | 42 |
| Per cent Sulphonyl chlorides in extract.................................... | 55 | 94 | 78 |
| Per cent Sulphonyl chlorides recovered.................................. | 84 | 52 | 49 |

From the foregoing, it can readily be seen that all three solvents are selective for the sulphonyl halides, and in a countercurrent procedure, preferably with backwash or reflux, a substantially complete recovery of relatively pure sulphonyl halides can be effected. When employing a second solvent immiscible with the foregoing solvents, for example petroleum ether, even more complete separation is attained. Attention is particularly directed to nitromethane which is capable of producing substantially pure extracts without the use of a second solvent, of reflux or of countercurrent extracting. Although the yield is slightly lower per gram of solvent than that obtained with methyl formate, its greater selectivity makes it a particularly desirable solvent.

*Example VI*

185 grams of paraffin wax are treated with a 2:1 mixture of sulphur dioxide and chlorine at a temperature of about 60° to 90° C. until the increase in weight is about 252 grams. 350 grams of the resulting colorless, viscous oil is transferred to a vacuum-walled separatory funnel and about 300 cubic centimeters of liquid sulphur dioxide and about 200 cubic centimeters of hexane are mixed therewith. After stirring for a short time, the viscous oil dissolves in the solvents. The liquid sulphur dioxide layer is separated from the hexane layer which is then washed successively with several portions of fresh liquid sulphur dioxide until about a liter of liquid sulphur dioxide solution is accumulated. The combined liquid sulphur dioxide solutions are washed with several small portions of hexane. Evaporation of the solvents from the liquid sulphur dioxide layer leaves about 327 grams of a greyish, very viscous oil, which dissolves completely in boiling 10% sodium hydroxide solution to give a clear solution of a sodium sulphonate substantially free of unsaponifiable material.

Example VII 188 parts by weight of paraffin wax are treated with a 1:1 mixture of sulphur dioxide and chlorine at about 60° to 90° C. until there is an increase in weight of about 197 parts. 350 parts of the resulting grey oil are extracted with liquid sulphur dioxide and hexane very much as in the previous example. Evaporation of the sulphur dioxide layer leaves a residue of 325 parts by weight of sulphonyl chloride. By evaporation of the hexane layer, 14 parts by weight of residue are left, of which 12 parts by weight are unsaponifiable, being substantially insoluble in boiling caustic alkali.

Example VIII 151 parts by weight of cetyl alcohol are treated at about 60° to 90° C. with a 2:1 mixture of sulphur dioxide and chlorine until there is a gain in weight of 75 parts and 69 parts by weight of chlorine have been passed in. 223 parts by weight of this dark oil are subjected to liquid sulphur dioxide-hexane extraction in the general manner described above. Evaporation of the sulphur dioxide solution leaves a residue of 121.5 parts by weight which, when boiled with caustic and then extracted with ether, is found to contain only a minor quantity of unsaponifiables.

Other solvents for polar compounds which may be employed in the present process as preferential solvents for the sulphonyl halides include dry ethyl alcohol, wet methanol, nitromethane, nitroethane, pyridine, furfuryl alcohol, furfural, glycolchlorhydrin, glycerol chlorhydrin, glycol, glycerol, dimethyl sulphate, diethyl sulphate, dibutyl sulphate, phenol, methyl formate, glycol monoformate, glycol diformate, ethyl formate, formic acid, methyl acetate, glycol monoacetate, glycerol monoacetate, acetic acid, acetic anhydride, acetonitrile (methyl cyanide), dichlordiethyl ether, trimethyl amine, liquid carbon dioxide, trichlormethyl chlorformate, phosgene, stannic chloride, liquid hydrogen fluoride, liquid hydrogen chloride, boron trifluoride dihydrate, nitrobenzene, 1 nitropropane, 2 nitropropane, cresol, sulphur monochloride and various miscible mixtures of the foregoing solvents. The last five mentioned solvents are more effective when used at low temperatures. It is preferred to employ liquid sulphur dioxide, methyl formate, methyl alcohol or nitromethane alone as the selective solvent in the process but it is possible to employ liquid sulphur dioxide with other polar solvents miscible therewith, such as acetone and dialkyl sulphates. In any event, it is advantageous to use low boiling solvents which can be readily removed from the sulphonyl halides or the corresponding hydrolyzed product by vaporization. In general, it has been found that the oxygen-containing organic and inorganic solvents are preferred for the separation. The solvents can be recovered for re-use with, but preferably without, intermediate purification in order to hold losses to a minimum. The recovered raffinate from the solvent purification can be treated again for the preparation of sulphonyl halides or may be employed for other purposes.

In several of the foregoing examples, hexane is employed for a suitable non-polar solvent substantially immiscible with the preferential solvent for obtaining greater selectivity, for removing last traces of "non-sulphonated" material from the polar solvent solution, and for maintaining the raffinate in a liquid condition when employing the preferred low temperatures with materials having high melting points. Other immiscible non-polar solvents may similarly be employed, such as low boiling aliphatic hydrocarbons, e. g., propane, butane, pentane, heptane, octane, nonane, petroleum ether, various other solvents which are immiscible with the polar solvents and mixtures of the foregoing solvents. Furthermore, when operating at low temperatures, it is necessary that the auxiliary solvent be of a sufficiently low melting point that it does not freeze.

The organic sulphonyl halides may be made by reacting a liquid organic material having a saturated hydrocarbon radical of at least 5 and preferably at least 11 carbon atoms with gaseous and/or liquid sulphur dioxide and gaseous and/or liquid chlorine at temperatures between about —40° and +90° C., preferably between about —25° and +15° C. in the presence of actinic light from any suitable source, such as ordinary light, bright sunlight, incandescent lamps, luminescence, ultraviolet arcs and the like. Solvents, such as liquid sulphur dioxide, carbon tetrachloride, chloroform and tetrachlorethane, may also be present during the reaction. The degree of reaction may be varied from very low, for example 5%, up to 90% or even higher. It is preferred, however, to work within the range of 30 and 60% sulphonation. The product may be prepared with or without chlorine substituents and may be mono- or polysulphonated depending upon the degree of reaction and ratio of sulphur dioxide and chlorine. In the reaction the proportion of sulphur dioxide is generally in excess of the chlorine, for example, between about 2 to 10 mols of sulphur dioxide to 1 mol of chlorine, preferably about 3:1 in employing gaseous reactants. By operating in the presence of liquid sulphur dioxide with or without liquid chlorine, it is possible to control the temperature by evaporation of one or both of these liquids under controlled pressure.

The extraction may be carried out in simple, single or multiple contact; countercurrent multiple contact, and continuous countercurrent. With the latter two, backwash or reflux is preferably employed to obtain thorough extraction. It is even possible to conduct the continuous extraction process simultaneously with the formation of the sulphonyl halides in the manner disclosed in Example II.

The extraction of the impure sulphonyl halide product can be conducted in several stages wherein the mixture is extracted first with one solvent and the raffinate thereof extracted with the second solvent, or the solvent-free extract from the first stage of extraction may be re-extracted with a second solvent. The solvent may be recovered from the extract and/or the raffinate by extraction with a suitable secondary solvent therefor. For example, it is possible to remove alcohol from the sulphonated halides by means of water. Extraction with the secondary solvent of a relatively low boiling point is particularly desirable in those cases where the primary extractant is high boiling. To illustrate, it is possible to remove nitroalkanes from the sulphonyl halide by extraction with cold aqueous alkali. The solvents may be recovered directly from the extract, raffinates or from the secondary solvents by any suitable method including distillation, evaporation, crystallization, salting-out or the like. The recovered solvents may then be reused for fresh materials.

Although the treatments of paraffin wax, alcohols, gas oil raffinates and alkanes are specifically disclosed, it is apparent that other organic materials having saturated hydrocarbon radicals of at least 5 carbon atoms can similarly be treated. For example, materials having a saturated hydrocarbon radical of at least 5 carbon atoms which may be treated alone or in mixture include olefines, such as decene, heptene, cetene, dodecene, hexane, tetraisobutylene and other polymerized olefines; paraffin hydrocarbons, such as dodecane, hexane, heptadecane, octadecane and hexadecane; petroleum hydrocarbons, such as paraffin wax, scale wax, white oil, kerosene, lubricating oils and raffinates of lubricating oil and kerosene extractions; cyclic compounds, including decalin, cyclohexane, methyl cyclohexane, and cyclohexene; sterols, including cholesterol, phytosterol and the like; resins and fatty acids and their monohydric and full and partial polyhydric alcohol esters, such as stearic acid, rosin, spermaceti, tallow, tall oil and coconut oil monoglycerides; alcohols and their derivatives, such as those recited in the copending application Serial No. 300,578 filed October 21, 1939, of which this application is a continuation-in-part; their halogen and other substituted derivatives, such as chlorinated paraffin wax, chlorinated gas oil, cetyl chloride and olefine halides; and various other aliphatic or cycloaliphatic materials and mixtures thereof.

The sulphonyl chlorides are preferably prepared by the reaction of the treatment of organic materials with sulphur dioxide and chlorine, but it is possible to prepare the sulphonyl halides by any method and to remove impurities therefrom by the present process. Not only aliphatic and cycloaliphatic sulphonyl halides can be so purified but also aromatic and heterocyclic sulphonyl halides can be similarly treated to remove non-sulphonated material therefrom. When removing relatively unsaturated materials, such as benzene, halogenated benzenes and unsaturated aliphatic compounds, it is particularly advantageous but not absolutely essential to use a secondary solvent immiscible with the preferential solvent for the sulphonyl halide.

The products may be in the form of the acids or the salts of sodium, potassium, calcium, magnesium, lithium, ammonia, mono-, di-, and triethanolamine, amino - trimethylol - methane, amylamines, methylamines, aniline, pyridine and like metals or compounds. The bases corresponding to the above metals or compounds may be used for hydrolyzing the sulphonyl halide products. The salts may be interchanged by the treatment of a solution of one salt of the novel compounds in a solvent, such as acetone, ethyl alcohol, isopropyl alcohol, butyl alcohol, dioxane, monoglycerides, Cellosolve and Carbitol with a concentrated aqueous solution of a soluble salt of an inorganic acid having a different cation than that of the product to be treated. The hydrolysis may be advantageously conducted in the presence of at least one of these solvents. The process also serves to remove inorganic salts, such as sodium chloride, from the product.

The sulphonate products obtained from the material prepared in accordance with the present invention, either as acids or salts, have good wetting, solubilizing, deterging, sudsing, water-softening, dispersing, emulsifying, penetrating, and equalizing properties. Since their calcium and magnesium salts are water-soluble, they operate efficiently in hard as well as in soft water. They are good wetting agents both in hot and cold treating baths, and function effectively in the presence of large quantities of inorganic salts.

Although the new materials possess unusual deterging, sudsing, and water-softening properties by themselves, their action may be augmented by the addition of any of the common auxiliary agents used in soap and detergent compositions. Suitable addition agents are other emulsifying agents, including soaps, rosinates, long chain alcohol sulphates, monoglyceride monosulphates, sulphonated mineral oil extracts, turkey red oil, lecithin, glycerolamines, diethanolamine and triethanolamine and their soaps; coloring matter, such as dyes, lakes, pigments; abrasives and fillers, such as silica, pumice, feldspar, precipitated chalk, infusorial earth, bentonite, talc, starch, and air; liquids, including carbon tetrachloride, perchlorethylene, trichlorethylene, glycerine, ethyl alcohol, glycol, tetrahydrofurfuryl alcohol, phenol, cyclohexanol, water, tetralin, hexalin, pine oil, mineral oil, mineral oil extracts, and naphtha; perfumes and deodorants; fats, oils, fatty acids, monoglycerides, vitamins, waxes, gums, glue, resins; germicides, such as phenol mercury chloride, phenyl mercury nitrate, phenyl mercury chloride, methyl ester of para hydroxy benzoic acid, methyl salicylate, and mercuric chloride; styptics, such as aluminum chloride and cephalin; any of the common water-soluble salts, water-softeners and builders, such as calcium chloride, magnesium sulphate, sodium bromide, iodide, borate, carbonates, silicate, full and partial ortho- and pyrophosphates, tetraphosphates, hexametaphosphates, tartrate, benzoate, citrate, formate, lactate, malate, sulphate, chloride, acetate, bicarbonate, sesquicarbonate, hypochlorite, thiosulphate, perborate, bisulphite, hydrosulphite and hyposulphate, or the corresponding potassium, ammonium and quaternary ammonium salts thereof. The type of addition agent to be used, of course, will depend on the ultimate use of the new compositions.

The final composition, with or without one or more addition agent, may be formed into beads, flakes, bars, chips, crystals, powders, solutions, liquid or plastic emulsions, pastes, creams, salves, or any other forms desired. The ingredients may be mixed by any of the common methods, such as grinding, stirring, kneading, crutching, fusing, and drying by rolls, spray or otherwise of mixed solutions.

The compositions may be used in various ways. such as washing compositions for wood, metal, stone, glass, china, earthenware, brick, masonry and painted, varnished or lacquered surfaces; insecticides; cements; rubber compositions; abrasive compositions; antiseptics; water-softeners; deodorants and disinfectants; water paints and polishes; sizes, glues and adhesives, such as shellac and casein compositions; liquid, solid and paste tooth and mouth detergents; laundry detergents and other textile agents, including laundry blueing, bleaching, dyeing, softening, lubricating, and discharging compositions; depilatories; dust-preventing compositions; fire extinguishing compositions; drain, lavatory and radiator cleaners; anti-freezing, anti-fogging and anti-corrosion compositions; wood and fibre impregnants; electrolytic baths; etching compositions; cosmetics, shaving and toilet preparations, shampoos and hair-wave lotions; tanning agents and fat-liquors for leather; photographic solutions; paint, stain and grease removers; dry-cleaning compositions; rug cleaners; petroleum deemulsifying compositions; fruit washing; fat splitting and esterification; preparation of dyes and dye intermediates; preparation of germicidal agents; preparation of resins and plasticizers; and any compositions requiring wetting, washing, emulsifying, penetrating, solubilizing, dispersing and like agents.

This application is a continuation-in-part of application Serial No. 281,885, filed June 29, 1939, which was granted December 8, 1942, as U. S. Patent No. 2,304,767.

As many apparently widely different embodiments of this invention may be made without departing from the spirit and scope thereof, it is to be understood that the application is not limited to the specific proportions or embodiments thereof except as defined in the following claims.

We claim:

1. The process which comprises reacting an organic compound having a saturated hydrocarbon radical of at least five carbon atoms with admixed sulphur dioxide and chlorine and removing sulphonyl chlorides formed during the reaction from the reaction mixture with a selective solvent for the sulphonyl chlorides.

2. In a process for producing surface-active products by reacting non-gaseous saturated hydrocarbons in the liquid phase with admixed gaseous sulphur dioxide and chlorine to form sulphonyl chlorides, the step which comprises extracting sulphonyl chlorides from the reaction mixture with an oxygen-containing preferential solvent for the sulphonyl chlorides.

3. The process which comprises reacting a hydrocarbon-containing compound having a saturated hydrocarbon radical of at least five carbon atoms with admixed sulphur dioxide and chlorine and continuously removing sulphonyl chlorides formed during the reaction from the reaction mixture with a selective solvent for the sulphonyl chlorides.

4. The process of purifying organic sulphonyl halides which comprises treating a composition containing an organic sulphonyl halide and other organic compounds with a substantially inert preferential solvent for the organic sulphonyl halide and a solvent substantially immiscible in said preferential solvent and non-reactive under the treating conditions, and separating the liquid phases.

5. The process which comprises extracting a reaction mixture containing an organic sulphonyl chloride and an organic unreacted compound of the type from which the organic sulphonyl chloride was formed with a preferential alcoholic solvent for the sulphonyl chloride.

6. The process of purifying organic sulphonyl chlorides containing admixed therewith other organic compounds which comprises extracting the organic sulphonyl chlorides with a short-chain nitroalkane.

7. The process of purifying organic sulphonyl chlorides containing admixed therewith other organic compounds which comprises extracting the organic sulphonyl chlorides with a preferential ester solvent therefor.

8. The process of purifying organic sulphonyl chlorides having admixed therewith other organic compounds which comprises extracting the organic sulphonyl chlorides with a short-chain monohydric alcohol.

9. The process of purifying organic sulphonyl chlorides containing admixed therewith other organic compounds which comprises extracting the organic sulphonyl chlorides with a short-chain formic acid ester.

10. The process of purifying organic sulphonyl chlorides having admixed therewith other organic compounds which comprises extracting the organic sulphonyl chlorides with a short-chain acid methyl alcohol ester.

11. The process of purifying organic sulphonyl chlorides having admixed therewith other organic compounds which comprises extracting the organic sulphonyl chlorides with methyl alcohol.

12. The process of purifying organic sulphonyl chlorides having admixed therewith other organic compounds which comprises extracting the organic sulphonyl chlorides with nitromethane.

13. The process of purifying organic sulphonyl chlorides having admixed therewith other organic compounds which comprises extracting the organic sulphonyl chlorides with methyl formate.

14. In a process for producing surface-active products by reacting saturated hydrocarbons with gaseous sulphur dioxide and chlorine in which all the hydrocarbon has not reacted with the gaseous sulphur dioxide and chlorine, the step which comprises extracting the sulphonyl chlorides with nitroalkane.

JOHN ROSS.
DWIGHT JAMES POTTER.

REFERENCES CITED

The following references are of record in the file of this patent:

UNITED STATES PATENTS

| Number | Name | Date |
|---|---|---|
| Re. 20,968 | Reed | Jan. 3, 1931 |
| 1,939,025 | Schweitzer et al. | Dec. 12, 1933 |
| 2,016,784 | Kranzlein et al. | Oct. 8, 1935 |
| 2,142,934 | Bruson et al. | Jan. 3, 1939 |
| 2,146,744 | Johnson | Feb. 14, 1939 |
| 2,147,346 | Johnson | Feb. 14, 1939 |
| 2,174,509 | Fox | Sept. 26, 1939 |
| 2,174,856 | Johnson | Oct. 3, 1939 |
| 2,193,824 | Lockwood et al. | Mar. 19, 1940 |
| 2,228,598 | Fox et al. | Jan. 14, 1941 |
| 2,276,097 | Salzberg | Mar. 10, 1942 |
| 2,277,325 | Hueter et al. | Mar. 24, 1942 |
| 2,333,568 | Henke et al. | Nov. 2, 1943 |
| 2,081,721 | Van Dijck | May 25, 1937 |
| 2,273,974 | Meiser | Feb. 24, 1942 |

FOREIGN PATENTS

| Number | Country | Date |
|---|---|---|
| 497,242 | Germany | Feb. 22, 1927 |